Patented Sept. 9, 1930

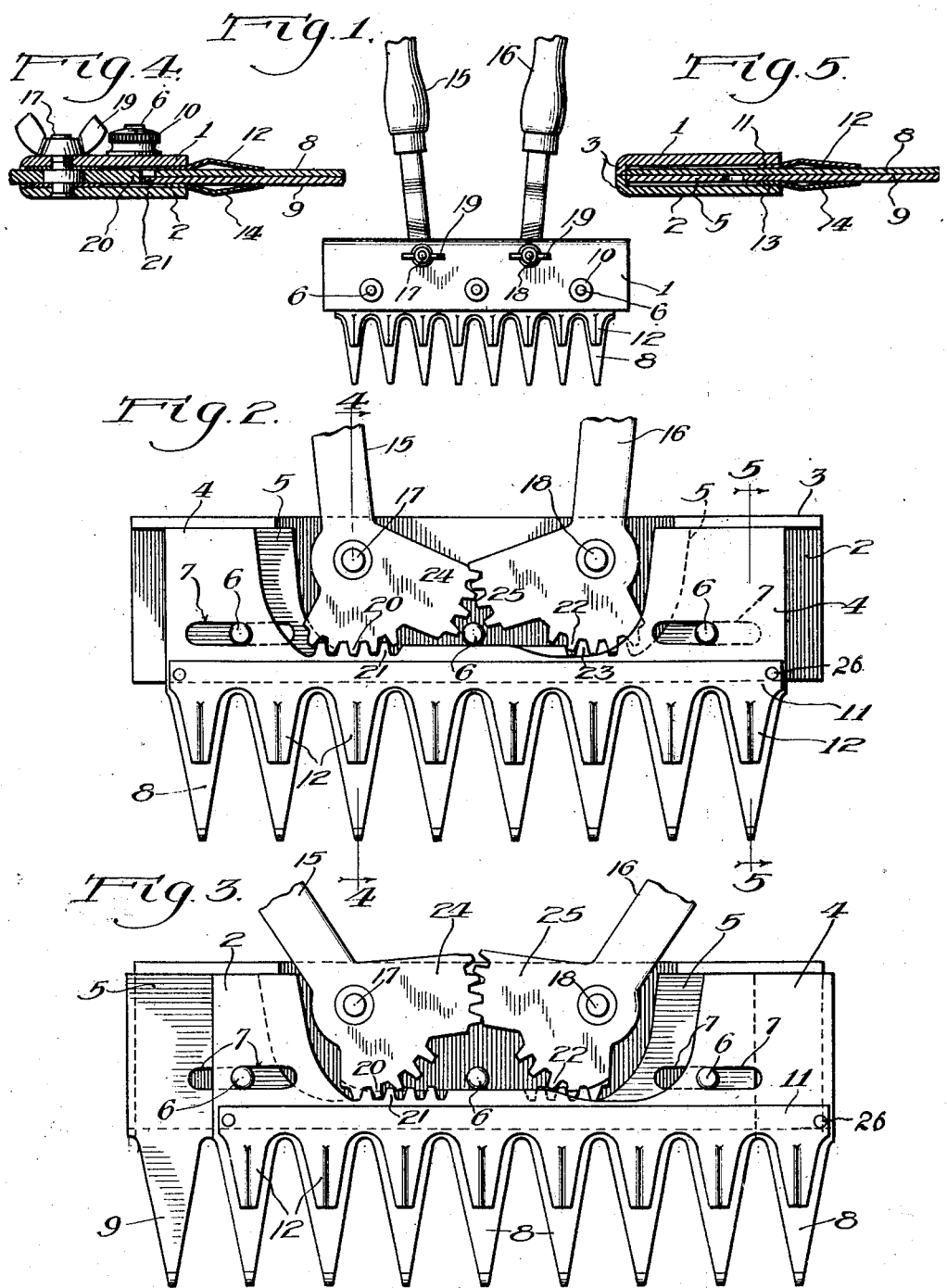

1,775,627

UNITED STATES PATENT OFFICE

JERRY TOLLMANN, OF CHICAGO, ILLINOIS, ASSIGNOR OF ONE-HALF TO FREDERICK C. HENNING, OF CHICAGO, ILLINOIS

HEDGE CLIPPER

Application filed February 20, 1929. Serial No. 341,358.

The present invention relates to tools adapted to make a cut over a considerable width in trimming a hedge or the like; and has for its object to produce a simple and novel tool that shall be light in weight and that can be operated with little effort.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a plan view of my improved tool; Figs. 2 and 3 are plan views, on an enlarged scale, with the top plate removed, showing the blades in their two extreme positions; Fig. 4 is a section on line 4—4 of Fig. 2; and Fig. 5 is a section on line 5—5 of Fig. 2.

Referring to the drawing, 1 and 2 represent an upper and a lower plate of a blade holder. Each plate has at one long edge a flange 3 extending at right angles thereto. When these plates are laid one upon the other, with their flanges in contact, they form a housing U-shaped in cross-section. Arranged in this housing are two long wide blades 4 and 5. The height of each flange 3 on the holder is approximately equal to the thickness of one of the blades, so that the plates 1 and 2 engage respectively with the top of the upper blade and the bottom of the lower blade. The lower plate 2 is provided with a plurality of pins 6 fixed thereto in any suitable way and projecting upwardly therefrom through the top plate. The blades are provided with slots 7 elongated in the direction of the lengths of the blades, and the pins 6 pass through these slots.

Each blade is provided along the front edge with long cutting teeth indicated at 8 and 9 respectively. The parts are so proportioned that when the pins 6 are in the left hand ends of the slots in the upper blade and in the right hand ends of the slots in the lower blade, as in Fig. 3, the teeth on the two blades, except those at the extreme ends, register with each other. When the blades are shifted, so as to bring the pins in the opposite ends of the slots from those in which they previously lay, each tooth on one blade will lie directly over the corresponding tooth on the other blade. The blades are therefore double acting, performing a cutting movement when travelling from either extreme position to the other.

The blades are clamped in the holder by means of suitable nuts 10, preferably thumb nuts, screwed upon the upper ends of the pins 6. These pins are located near the front edge of the holder, so that by tightening the nuts thereon, the blades will be pressed together in order that the teeth may have a true shearing action when the blades are reciprocated. In order that the pressure on the blades may be a yielding one, insuring that the blades will be pressed together even after wear takes place, I prefer to place between the holder and the blades resilient pressure transmitting means. In the arrangement shown, overlying the blade 4 is a spring plate 11 extending lengthwise of the blade inwardly from the inner ends or bases of the teeth, and having fingers 12 projecting outwardly or forwardly therefrom, one above each of the cone teeth 8. A similar plate 13, having spring fingers 14, is placed underneath the blade 5, the spring fingers extending forwardly or outwardly underneath the cutting teeth 9. The body portions of the spring plates lie in such positions that they are engaged by the two halves of the holder. When the nuts 10 are screwed down the holder members press on the spring plates and tend to flatten them. The result is that pressure, tending to force each upper cutting tooth against the corresponding underlying tooth is transmitted to the teeth about midway between their ends, through the spring fingers. By this arrangement, cooperating cutting teeth will be caused to contact with each other throughout their entire lengths, and a yielding pressure is maintained thereon.

The blades are reciprocated by means of two handles, 15 and 16, projecting rearwardly from the holder. The major portion of each of the blades is cut away at the back, excepting only at the two ends. The forward ends of the handles project into the space thus provided in the holder, and each is there pivotally connected to the holder by means of a stationary stud, such as indicated at 17 and 18, fixed in the lower plate 2 of the holder and adapted to project upwardly through the top plate of the holder. The upper end of each stud is screwthreaded and is provided with a suitable nut 19 that rests on top of the top plate of the holder, near the rear edge, and assists in securing the two halves of the holder together. On the inner end of each of the handles are two gear segments. One of the segments 20, on the handle 15, meshes with a rack 21 on the upper blade 4. The corresponding segment 22, on the handle 16, meshes with a rack 23 on the lower blade 5. The segments 24 and 25 on the handles 15 and 16, respectively, mesh with each other. The result is that when the handles are swung on their pivots, the blades are reciprocated in opposite directions and to the same extent, neither handle being capable of swinging farther or through a lesser angle than the other, because they are geared together.

In Fig. 2 the blades are shown at one limit of their strokes, whereas in Fig. 3 they are shown at the other limit. It will be seen that the extreme relative movement, from one limit to the other is equal to the distance from one tooth to an adjacent tooth on the same blade. Therefore, since the movements of the blades are equal and opposite, the total movement that each blade must make with respect to the holder is through a distance equal to only one-half the distance from one tooth to another in that blade. Because of the short distance travelled by each blade, the handles exert a powerful leverage and make it possible to cut through comparatively thick limbs or stems with little effort. Furthermore, the operating forces are equalized, so that it is easy to hold the tool steady while operating it.

The spring plates 11 and 13 must, of course, be secured in some manner to the blades with which they are respectively associated. This can conveniently be done by means of pins or rivets 26, of which one at each end of each spring plate will be sufficient.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:—

1. A tool of the character described comprising a holder, composed of two spaced plates engaged with each other along their rear edges, two reciprocating blades lying one upon the other in the holder, handle means on the holder, means between the handle means and the blades to cause the latter to move simultaneously and in opposite directions when the handle means is operated, spring pressure devices between the front portions of the holder plates and the blades, and means to draw the front portions of the plates together to compress the spring devices.

2. A tool of the character described comprising a holder, composed of two spaced plates engaged with each other along the rear, blades lying one upon the other in the holder and projecting beyond the front thereof, shearing teeth along the front of the blades, bowed spring plates arranged between the front portions of the plates and the blades and having fingers extending out over the shearing teeth, and means to draw together the front portions of the holder and flatten the spring plates.

In testimony whereof, I sign this specification.

JERRY TOLLMANN.